Patented Aug. 10, 1954

2,686,199

UNITED STATES PATENT OFFICE 2,686,199

REACTION PRODUCT OF BISPHENOL-A AND SALICYLIC ACID

Lloyd O. Bentz, Akron, Ohio, assignor to The Firestone Tire & Rubber Company, Akron, Ohio, a corporation of Ohio No Drawing. Application July 19, 1949, Serial No. 105,671

3 Claims. (Cl. 260—474)

This invention relates to a novel composition of matter produced by the reaction of bisphenol-A and salicylic acid under esterifying conditions. The composition is believed to consist esentially of a mixture of mono- and di-salicylates of bisphenol-A having the respective formulae (I) 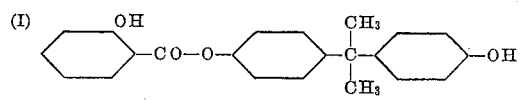

and (II) 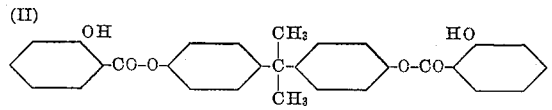

The composition may be used, inter alia, as a stabilizer in chlorine-containing high polymeric resins.

Referring to the bisphenol-A entering into the synthesis of the composition of this invention, this is a known compound of the formula (III) 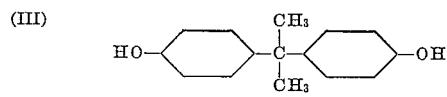

designated under the Geneva system as di-(4-hydroxyphenyl)-dimethylmethane. In accordance with this invention, bisphenol-A is reacted under esterifying conditions with two or more moles, for each mole of bisphenol-A, of salicylic acid. Usually, not more than three moles of salicylic acid will be employed for each mole of bisphenol-A. The resultant product is not readily resolvable for the determination of its ultimate constitution, but upon molecular distillation yields roughly two fractions, one liquid and one solid which are believed to be mono- and di- salicyclic esters of bisphenol-A having the Formulae I and II above.

More particularly with regard to the esterifying conditions mentioned hereinabove, these may be any conditions customarily used for the production of esters of phenolic compounds with aromatic acids. For instance the reaction may be carried out in the presence of acid catalysts such as phosphorus oxychloride, sulfuric acid, phosphorus acid, and anhydrous hydrogen chloride. Likewise the reaction may be carried out in the presence of inert solvents such as benzene, toluene, xylene, petroleum ether and the like. Temperatures will usually be within the range 50° C.–200° C., and the reaction is carried out to an extent such as to abstract between 1.5 and 2.0 moles of water for each mole of bisphenol-A employed.

The compositions of this invention have particular application in chlorine-containing resins as stabilizers against the action of light and atmospheric oxidation. Examples of chlorine-containing resins which may advantageously be stabilized by the addition of the product of this invention are polymers of vinyl chloride, of vinylidene chloride and of 2,3-dichloro-1,3-butadiene and copolymers thereof with other unsaturated compounds copolymerizable therewith and containing an amount (say 25% or more) of vinyl chloride, vinylidene chloride or 2,3-dichloro-1,3-butadiene such that the mechanisms of decomposition of the residues of these compounds contribute substantially to the degradation of the copolymers. Likewise, the compounds of this invention may be added to chlorinated high polymers, such as chlorinated natural rubber, chlorinated polybutadiene, chlorinated polyisoprene, chlorinated polyethylene and the like, and when so added will greatly improve the stability thereof. Generally the compound of this invention will be added to such chlorine-containing resins to the extent of from 0.2% to 4.0%, based on the weight of such resins.

With the foregoing general discussion in mind, there are given herewith detailed instructions for the preparation of the product of this invention. All parts given are by weight.

EXAMPLE I

Mixed product

| | Parts |
|---|---|
| Bisphenol-A | 228 |
| Salicylic acid | 276 |
| Phosphorus oxychloride (POCl₃) | 107.6 |
| Toluene | 215 |

The above ingredients were charged into a reaction vessel provided with a reflux condenser and with heating means. The charge was refluxed for 15 hours, cooled to room temperature and washed successively with deionized water, 5% aqueous sodium hydroxide, and finally again with deionized water. The solution was then dried over anhydrous sodium sulfate and subjected to distillation to remove the toluene. The product remaining after removal of the solvent was a sticky, viscous, clear, amber-colored liquid. This product was readily compatible with polymers of vinyl chloride and of 2,3-dichloro-1,3-butadiene and when incorporated in these resins to the extent of from 0.2% to 4.0%, based on the weight of the resins, greatly improved the stability of the resins against deterioration by light and atmospheric action.

EXAMPLE II

Molecular distillation 416 parts of the product produced as just described were subjected to molecular distillation at progressively increasing temperatures and decreasing pressures. Tabulated herewith are the conditions under which the respective cuts were taken, together with the amounts of the cuts and the properties thereof.

TABLE I

| Cut No. | Temperature (° C.) | Pressure (microns) | Wt. of Fraction (parts) | Color | State |
|---|---|---|---|---|---|
| 1 | 110 | 30 | 23 | light yellow | viscous liquid. |
| 2 | 110 | 25 | 15.3 | ----do---- | Do. |
| 3 | 120 | 12 | 35.5 | yellow | Do. |
| 4 | 130 | 13 | 25.1 | dark yellow | Do. |
| 5 | 140 | 11 | 15.5 | ----do---- | liquid. |
| 6 | 150-180 | 12 | 25.2 | orange | solid. |
| 7 | 190 | 15 | 19.7 | ----do---- | Do. |
| 8 | 200 | 14 | 16.6 | ----do---- | Do. |
| 9 | 210 | 12 | 19.5 | ----do---- | Do. |
| 10 | 220 | 13 | 28.9 | ----do---- | Do. |
| 11 | 230 | 25 | 16 | light orange | Do. |
| Residue | | | 187 | black | Do. |

All of these fractions had substantially equivalent, and very satisfactory, stabilizing action when incorporated into polymers of 2,3-dichloro-1,3-butadiene and of vinyl chloride.

What is claimed is:

1. An ester selected from the group consisting of the monosalicylate and the disalicylate of di-(4-hydroxyphenyl)-dimethylmethane.

2. The di-salicylate of di-(4-hydroxyphenyl)-dimethylmethane.

3. The mono - salicylate of di - (4 - hydroxyphenyl)-dimethylmethane.

References Cited in the file of this patent

UNITED STATES PATENTS

| Number | Name | Date |
|---|---|---|
| 350,012 | Nencki et al. | Sept. 28, 1886 |
| 2,157,068 | Carruthers | May 2, 1939 |
| 2,191,831 | Perkins | Feb. 27, 1940 |
| 2,320,228 | Ivey | May 25, 1943 |
| 2,392,361 | Britton | Jan. 8, 1946 |
| 2,400,034 | Tallman | May 7, 1946 |
| 2,537,639 | Bentz et al. | Jan. 9, 1951 |

OTHER REFERENCES

Morawetz, Ind. and Eng. Chem., July 1949, vol. 41, #7, pp. 1442-7.

Chem. Abstracts, vol. 28, page 142.